June 22, 1937.   G. A. JOHNSON   2,084,616
FLEXIBLE ARMORED ELECTRIC CABLE
Filed July 25, 1930
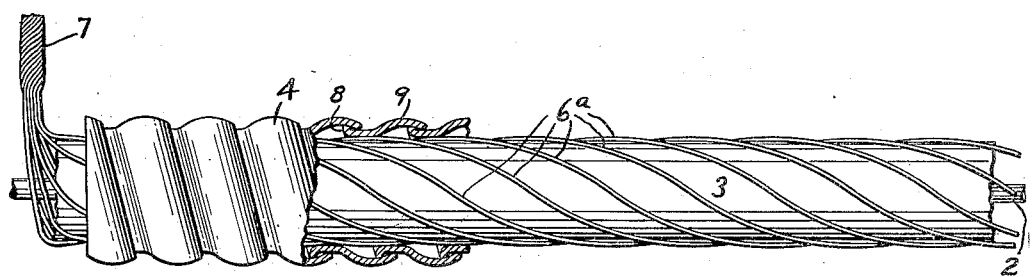
INVENTOR
BY Gustave A. Johnson
ATTORNEY Patented June 22, 1937

2,084,616

UNITED STATES PATENT OFFICE 2,084,616

FLEXIBLE ARMORED ELECTRIC CABLE

Gustave A. Johnson, Irvington, N. J., assignor to General Cable Corporation, New York, N. Y., a corporation of New Jersey Application July 25, 1930, Serial No. 470,610

1 Claim. (Cl. 173—267)

This invention relates to flexible armored cable designed for house-wiring.

Objects of the invention are to reduce the size and weight of such cable, thereby reducing manufacturing, freight and handling costs and facilitating installation, to secure a high degree of flexibility, to obtain the high degree of strength necessary for house-wiring, and to provide a cable which can be used with existing fittings.

In my prior applications Serial No. 443,018, filed April 10, 1930, (now Patent No. 1,843,561, dated Feb. 2, 1932), and Serial No. 446,262, filed April 22, 1930, I have disclosed cables of this class comprising an insulated conductor, constituting the live wire, a flexible metal armor, and a bare neutral or return conductor disposed helically between the insulated conductor and the metal armor.

The present invention provides an improvement on my previous conductors, advantages of which are greater flexibility, greater convenience in attaching the return conductor to terminals, and less possibility of the return conductor becoming interrupted by breaking as the result of accidental nicking when the armor is cut back from the end of the cable for making connections.

These advantages are obtained by a construction in which the helically disposed bare neutral or return conductor lying next the armor is made up of or constituted by a multiplicity of elements. In one form of the invention the return conductor consists of a number of small strands equally distributed about the insulated conductor and all running helically in the same direction.

In the accompanying drawing forming part hereof:

The single figure is a side view of a small portion of a cable embodying the improvements in one form, the armor, which is of course coextensive with the cable, being shown for only part of the length illustrated and being partly in section.

In the figure, 2 is the live wire at the center of the cable, surrounded by insulation 3 suitable for the purpose. The armor 4 is of that type comprising a substantial metal strip wound helically about the conductor, the strip being shaped by a forming die so that one-half of the strip, more or less, is substantially flat and terminates along the edge in an outwardly directed lip 8, while the other half, more or less, is thrown into an arch 9, the arch of one convolution hooking over the lip of the adjacent convolution to produce a strong interlock which allows the convolutions to move readily on each other when the cable is flexed. The strands 6a comprise the bare return conductor wound helically, in moderately long convolutions, about the insulation of the live wire and in contact with the armor. This conductor, instead of being a solid wire or flat strip, is made up of numerous small copper wires 6a equally spaced about the insulated conductor and inside of the armor. Naturally the elements of this conductor may be more or less numerous depending on their size, and while each is preferably a single small wire they may in turn be composed of finer strands. In making an installation the armor is cut back from the ends of the length of cable, and the ends of the strands 6a are gathered together as shown at 7 for convenient attachment to terminals.

It will be understood that the ends of the armor are connected to the outlet boxes or to a ground in the usual way, and that the ends of the conductors are connected to the positive and negative terminals of the boxes.

The current-carrying capacity of the return conductor, or the combined current-carrying capacities of the return conductor and of the armor, is or are at least equal to the current-carrying capacity of the insulated conductor 2.

I claim:

An electrical cable of the class described, comprising an insulated conductor constituting a live wire, a flexible, helical metal armor closely surrounding the insulated live-wire conductor, and a bare neutral or return conductor disposed helically between the armor and the insulated conductor and in intimate electrical contact with the former, said return conductor comprising a multiplicity of elements distributed about the insulated conductor.

GUSTAVE A. JOHNSON.